United States Patent [19]
Saitou

[11] 3,932,868
[45] Jan. 13, 1976

[54] ALARM BUZZER DEVICE

[75] Inventor: Hisashi Saitou, Kasugai, Japan

[73] Assignee: Kabushiki Kaisha Saikosha Seisakusho, Kasugai, Japan

[22] Filed: Sept. 9, 1974

[21] Appl. No.: 504,419

[30] Foreign Application Priority Data
Mar. 13, 1974 Japan.............................. 49-28835

[52] U.S. Cl.............. 340/384 R; 340/402; 200/333;
200/293; 200/61.44; 174/52 R
[51] Int. Cl.².......................................... G08B 3/00
[58] Field of Search ........... 340/134, 135, 321, 402,
340/387; 174/52 R; 116/137 R, 142 R;
200/61.44, 61.78, 293, 303, 330, 333, 340,
158 A

[56] References Cited
UNITED STATES PATENTS
685,614 10/1901 Keil................................ 200/303 X
3,036,183 5/1962 Felten............................. 200/159 A FOREIGN PATENTS OR APPLICATIONS
927,747 6/1963 United Kingdom................ 340/134

Primary Examiner—John W. Caldwell
Assistant Examiner—William M. Wannisky
Attorney, Agent, or Firm—Frank J. Jordan

[57] ABSTRACT

An alarm buzzer device for a bicycle, emergency call or the like, incorporates an electric power source, for instance, a dry cell therein. The device comprises a housing accomodating various elements, such as a buzzer element, stationary and movable contacts, and a lid for covering an open end of the housing and arranged floatingly relative to the housing by the movable contact, so that the device can be actuated by pressing any portion of the upper surface of the lid.

4 Claims, 6 Drawing Figures

ALARM BUZZER DEVICE

BACKGROUND OF THE INVENTION

The present invention relates to an alarm buzzer device, and more particularly to an alarm buzzer device which incorporates an electric power source for actuating a buzzer element therein. The device is especially applicable as a stationary alarm fixed to bicycles and the like or as a portable alarm for emergency call and the like.

For such type alarm buzzer devices, it is generally and basically required to have a simple structure for facilitating repairs and to arrange structural elements or members therefor so as to ensure a reliable operation. A conventional alarm buzzer device for bicycles has, however, a disadvantage in that its operation is not always reliable for the following reason. The conventional device has an actuating push button of a comparatively small size, for instance, a push botton as small as the tip of a rider's finger. With such a small push button, a user is apt to fail in actuating the buzzer device when an alarm sound is necessary, because he has to locate the small actuating button by feeling without seeing it while concentrating his attention on road conditions.

In order to fulfill the requirements as referred to I have proposed an improved alarm buzzer device for bicycles having a pivoted actuating knob as disclosed in U.S. Pat. No. 3 521 275. The knob for the device as disclosed in the aforementioned U.S. Pat. has a configuration of a substantially triangular ridge-like ring mounted on a part of a lid for the device, so that, when a part of the ring-like knob is pressed downwardly by a finger of the bicycle rider, the ring swings to depress a flexible movable contact toward a stationary contact for completing a circuit with the aid of a pin fixed to the triangular knob at a portion near one of the three vertexes thereof and a leaf spring fixed to the pin. The device as disclosed in the aforementioned U.S. Patent has an advantage in providing a larger operating area than that of the conventional push button for the alarm buzzer device as referred to, but there still exists the possibility that the rider may push not the knob but the lid in haste.

SUMMARY OF THE INVENTION

A principal object of the present invention is to provide an alarm buzzer device, wherein a lid per se for the device forms a portion for actuating the device, so that a user can actuate the device to generate an alarm sound by pressing any portion of the upper surface of the lid.

Another object of the invention is to provide an alarm buzzer device which has a simple structure, ensures a reliable operation, and can be produced and assembled with a relatively low cost.

A still other object of the invention is to provide an alarm buzzer device which has a simple structure and can be constructed in a compact size, so that the device is applicable as a portable alarm for warning or emergency call.

Further objects of and advantages to be attained by the invention can be appreciated by understanding the following explanation which shall be made by referring to embodiments as illustrated in the drawings, in which

DESCRIPTION OF THE PREFERRED EMBODIMENTS

Figure 1:
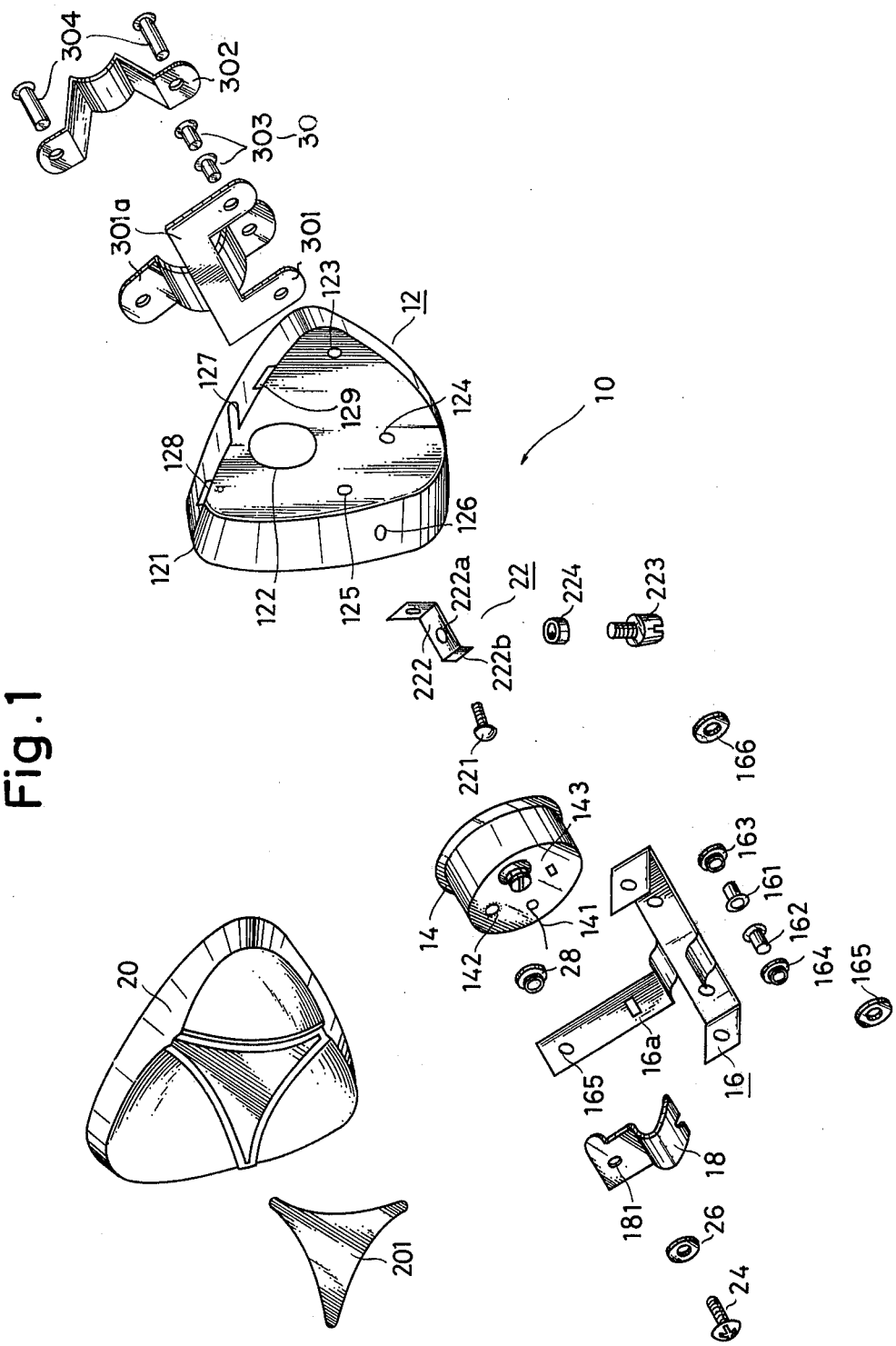
FIG. 1 is a disassembled or exploded perspective view of one embodiment of an alarm buzzer device according to the invention.
Figure 2:
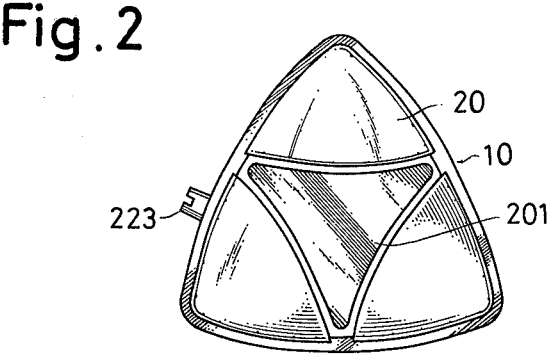
FIG. 2 is a top plan of the device shown in FIG. 1.

Referring to FIGS. 1 and 2 which illustrate an embodiment of the present invention, an alarm buzzer device is generally designated by reference numeral 10. The device 10 comprises a housing 12, a buzzer element 14 which is of a conventional type and is to be accommodated in the housing 12, a keel or battery holder 16, anode side of which is to be connected with a lead wire 141 for the buzzer element 14, a flexible contact or resilient contact arm 18, one end of which is mounted insulatingly on the buzzer element 14, a lid 20 to cover an open end 121 of the housing 12, and a means 22 for detachably engaging the lid 20 with the housing 12. In the illustrated embodiment, the housing 12 and lid 20 have a substantially triangular cross section, respectively, but those members may have any other configuration, for instance, having a circular or rectangular cross section. The housing 12 has a plurality of openings 122, 123, 124, 125, 126, a notch 127 and claws 128, 129. The opening 122 is provided to diffuse alarm sound generated by the buzzer element 14. The openings 123 and 124 serve to accomodate eyelets 161, 162 to secure the battery holder 16 through insulating rings 163, 164 made of a synthetic plastic material such as polyethylene. The opening 125 accomodates a rivet 221 to secure a ratchet 222. Through the opening 126 and an opening 222a provided to the ratchet 222, a ratchet screw 223 is inserted to engage with a ratchet nut 224. The ratchet 222, ratchet screw 223 and ratchet nut 224 form the lid mounting means 22. The notch or slit 127 accomodates a projection or rib (not shown) formed on the inner surface of the lid 20. The claws 128, 129 formed integrally to the housing 12 so as to extend outwardly and a claw 222b formed at the free end of the ratchet 222 can loosely be accomodated in blind holes (not shown) formed in the inner surface of the lid 20. The flexible contact or resilient contact arm 18 is securedly mounted on the buzzer element 14 by a screw 24 which is inserted through an opening 181 formed in the arm 18, an insulating ring 26 made of synthetic plastic material or fiber, an opening 165 formed in a leg portion 16a of the battery holder 16 and another insulating ring 28 made of synthetic plastic material or fiber and engaged with a screwed opening 142 formed in a casing for the buzzer element 14. The leg portion 16a serves as a stationary contact cooperating with the flexible contact 18 and as means for holding the buzzer element 14 in position. The lid 20 may be made of a suitable synthetic plastic material and may have a decorative metallic plate 201 to be fixed with use of an adhesive on a suitable portion of the outer surface of the lid 20.

On the under surface of the housing 12, a metal fixing may be secured, so that the buzzer device 10 can be fixed to a holding means (not shown), for instance to a handle pipe of a bicycle. As the metal fixing, the members or elements shown generally by reference numeral 30 in FIG. 1 may be used. The metal fixing 30 comprises a first fixing member 301 having a leg portion 301a, a second fixing member 302, eyelets 303 for fixing the leg portion 301a to the housing 12, and screws 304 for connecting the second member 302 to the first member 301.

Figure 3:
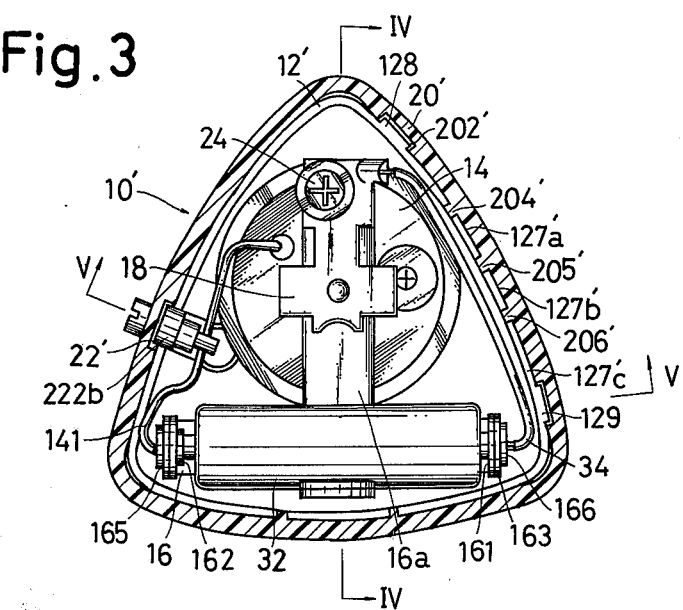
FIG. 3 is a partial sectional view of another embodiment of the device shown in FIG. 4, obtained by cutting off the lid and taken along the line III — III of FIG. 4 to show the inner mechanism of the device.
Figure 4:
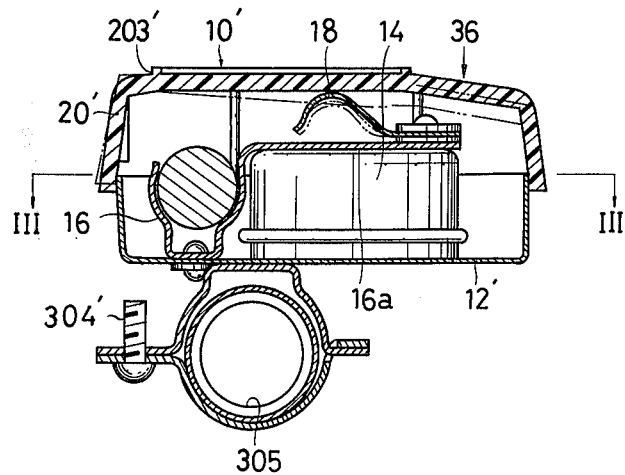
FIG. 4 is a partial sectional view of the device shown in FIG. 3 by cutting elements or members for the device excepting the buzzer element, taken along line IV — IV of FIG. 3 to show the cooperating relation between the lid and flexible contact.

In FIGS. 3 to 6, there is shown a second embodiment of the buzzer device according to the present invention. The device 10' of this embodiment is substantially the same as the device 10 in the lst embodiment, except for the design of the lid and housing. In the first embodiment shown in FIGS. 1 and 2, the lid 20 has a substantially triangular decorative plate 201 and has only one inner projection fitting into the slit or notch 127 formed in the side surface of the housing 12, while, in the second embodiment, a lid 20' has a circular decorative plate (not shown) to be accommodated in and adhered on a central cavity formed by a ring-like ridge 203' on the outer surface of the lid 20' and has three projections or rib 204', 205', 206' --- (see FIG. 3) formed on the inner peripheral surface thereof to be accommodated in slits or notches 127'a, 127'b, 127'c --- corresponding to the single notch 127 (see FIG. 1). The configuration and structure of a metal fixing 30' illustrated in FIG. 4 are somewhat different from those of the metal fixing 30 illustrated in FIG. 1. The metal fixing 30' has such an advantage that the mounting of the buzzer device 10' to a pipe 305, for instance a handle pipe of a bicycle can be done with use of only one screw 304'.

As seen in FIG. 3, one of two terminals of the buzzer element 14 is connected to the anode side of the keel or holder 16 for a battery, for instance, a dry cell 32 by the lead wire 141, namely to the eyelet 162 mounted to the battery holder 16 through an insulating fiber ring 165 and the insulating plastic ring 164 (see also FIG. 1), and the other terminal is connected to the flexible or movable contact 18. The movable contact 18 is connected to the cathode side of the battery holder 16 by a lead wire 34, namely to the eyelet 161 mounted to the battery holder 16 through an insulating fiber ring 166 and the insulating plastic ring 163 (see also FIG. 1).

Figure 5:
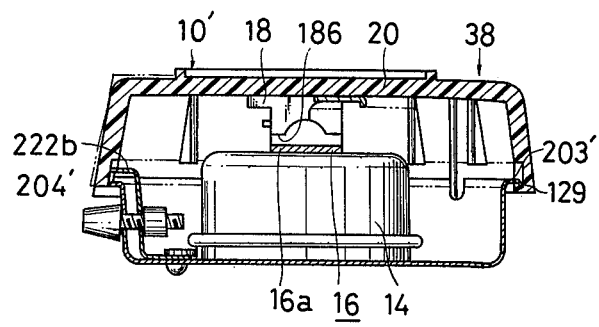
FIG. 5 is a partial sectional view of the device shown in FIG. 3 by cutting elements or members of the device excepting the buzzer element, taken along line V — V of FIG. 3 to show the cooperating relation between the lid and the flexible contact and the gap, in normal or non-actuated condition, between the flexible contact and a stationary contact.

As shown in FIGS. 4 and 5, the flexible or movable contact 18 is normally urged to press the lid 20' upwardly by an elastic force thereof, so as to floatingly hold the lid with the aid of claws 128, 129, 222b and blind holes 202', 203', 204' which are formed in the inner peripheral surface of the lid 20' to loosely accomodate the respective claw. When the lid 20' is fitted on the housing 12', as shown in FIGS. 3 to 5, the lid 20' can be pressed to contact the flexible or movable contact 18 with a stationary contact to complete a circuit for energizing the buzzer element 14. In the illustrated embodiment, the stationary contact is formed as the leg portion 16a of the keel or battery holder 16 but this contact may be of the upper surface 143 (see FIG. 1) of the buzzer element 14.

Figure 6:
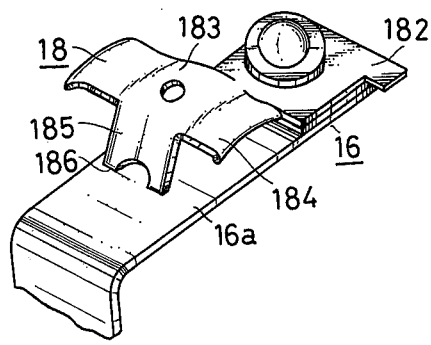
FIG. 6 is a partial and enlarged perspective view showing the flexible and stationary contacts.

The flexible contact or resilient contact arm 18 may have a configuration as shown in FIG. 6. The contact 18 comprises a flat base 182 with the opening 181 (see FIG. 1), an inclined narrow leg 183, a flat or curved wide head 184 an upper surface of which contacts with inner surface of the lid 20' when the lid is mounted on the housing to cover the open end thereof, and a narrow and short end portion 185 which is inclined toward the stationary contact 16a. The structure of the flexible contact 18 as illustrated in FIG. 6 has such advantages that the resilient arm can easily be bent by pressing the upper surface of the lid 20' to make contact of a free edge 186 of the contact 18 with the stationary contact 16a, since the leg portion 183 is made narrow and that the force for pressing the upper surface of the lid 20' can ensuredly be transmitted to the flexible contact 18, since the surface of the head 184 contacting with the inner surface of the lid 20' is made wide.

Since the buzzer device according to the present invention is constructed as referred to hereinabove, even if a user presses an edge portion on the upper surface of the lid in haste as shown by arrows 36, 38 in FIGS. 4 and 5, the lid 20' moves swingingly as shown in two-dots-dash- lines in the Figures to make a stable contact of the tip or free end 186 of the flexible contact 18 with the stationary contact 16a as the leg portion of the battery holder 16.

I claim:

1. An alarm buzzer device comprising a housing, a buzzer element accommodated in said housing, a battery for actuating said buzzer element, means for holding the battery, a resilient contact arm mounted insulatingly on said buzzer element, a lead wire for connecting the anode side of said battery holder to the input side of said buzzer element, another lead wire for connecting the cathode side of said battery holder to said resilient contact arm, a cover member for covering said housing and arranged floatingly by said resilient contact arm, and engaging means for detachably engaging said cover member with said housing, said engaging means comprising claws formed stationary on said housing, a movable claw operable from outside said housing, and blind holes formed in side walls of said cover member to each loosely engage with each of said claws.

2. An alarm buzzer device as claimed in claim 1, wherein said movable claw is a ratchet with a ratchet nut, which can be operated by a ratchet screw engaging with said ratchet nut.

3. An alarm buzzer device as claimed in claim 1, wherein said housing has at least one notch formed in a side wall thereof to accommodate a projection formed on an inner side wall of said cover member.

4. An alarm buzzer device as claimed in claim 1, wherein one end of said resilient contact arm is securely mounted on said buzzer element by a screw through a ring member electrically insulating between said contact arm and said buzzer element, so that said resilient contact arm urges said cover member upwardly with its resilient force to floatingly and stably hold said cover member with the aid of said claws-blind holes engagement.

* * * * *